US012068090B2

(12) United States Patent
Yamamoto et al.

(10) Patent No.: US 12,068,090 B2
(45) Date of Patent: Aug. 20, 2024

(54) INSULATED WIRE, COIL, AND ELECTRICAL OR ELECTRONIC EQUIPMENT

(71) Applicant: ESSEX FURUKAWA MAGNET WIRE JAPAN CO., LTD., Tokyo (JP)

(72) Inventors: Ayumi Yamamoto, Tokyo (JP); Keisuke Ikeda, Tokyo (JP); Keiichi Tomizawa, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 255 days.

(21) Appl. No.: 17/680,720

(22) Filed: Feb. 25, 2022

(65) Prior Publication Data

US 2022/0181043 A1 Jun. 9, 2022

Related U.S. Application Data

(63) Continuation of application No. PCT/JP2020/043679, filed on Nov. 24, 2020.

(30) Foreign Application Priority Data

Nov. 25, 2019 (JP) ................................ 2019-212158

(51) Int. Cl.

| | |
|---|---|
| ***H01B 3/46*** | (2006.01) |
| ***H01B 3/30*** | (2006.01) |
| ***H01B 7/02*** | (2006.01) |
| ***H01F 5/06*** | (2006.01) |

(52) U.S. Cl.

CPC ............... *H01B 3/46* (2013.01); *H01B 3/308* (2013.01); *H01B 7/02* (2013.01); *H01F 5/06* (2013.01)

(58) Field of Classification Search

CPC ........ H01B 3/305; H01B 3/301; H01B 3/306; H01B 3/308; H01B 3/421; H01B 3/36;

(Continued)

(56) References Cited

U.S. PATENT DOCUMENTS

| | | | | |
|---|---|---|---|---|
| 2013/0000951 A1* | 1/2013 | Honda | .................. | H01B 3/306<br>174/120 SR |
| 2016/0307667 A1* | 10/2016 | Fukuda | .................... | H02K 3/02 |

(Continued)

FOREIGN PATENT DOCUMENTS

| | | | |
|---|---|---|---|
| CN | 110352463 A | 10/2019 | |
| JP | 2018-029004 A * | 2/2018 | ............... H01B 7/02 |

(Continued)

OTHER PUBLICATIONS

Chinese Office Action and Search Report for corresponding Chinese Application No. 202080047884.X, dated Apr. 29, 2023, with English translation.

(Continued)

*Primary Examiner* — William H. Mayo, III

(74) *Attorney, Agent, or Firm* — Birch, Stewart, Kolasch & Birch, LLP

(57) ABSTRACT

An insulated wire, including: a conductor and an insulating film covering the conductor; in which at least one insulating layer constituting the insulating film contains: a thermosetting resin A, and a resin B that is ranked lower than the thermosetting resin A in a tribo-electric series.

10 Claims, 1 Drawing Sheet

(58) Field of Classification Search
CPC ........ H01B 7/009; H01B 7/02; H01B 7/0225; H01B 7/0275; H01B 7/2813; H01B 7/292; H01B 7/0036; H01B 13/065; H05K 3/02; H05K 3/04; H05K 3/12; H05K 3/32; H05K 3/34; H05K 15/04; H05K 15/105
USPC ............. 174/102 R–102 SC, 110 R–110 PM, 174/120 R–122 SR
See application file for complete search history.

(56) References Cited

U.S. PATENT DOCUMENTS

| | | | | |
|---|---|---|---|---|
| 2017/0004900 | A1* | 1/2017 | Ishii | H02K 15/105 |
| 2018/0288532 | A1 | 10/2018 | Oya | |
| 2018/0358856 | A1* | 12/2018 | Oya | H01B 7/0009 |
| 2020/0035407 | A1 | 1/2020 | Urushihara et al. | |
| 2020/0365284 | A1 | 11/2020 | Tomizawa et al. | |

FOREIGN PATENT DOCUMENTS

| | | | |
|---|---|---|---|
| JP | 2018-29004 | A | 2/2018 |
| WO | WO 2017-098998 | A1 | 6/2017 |
| WO | WO 2017/142036 | A1 | 8/2017 |
| WO | WO 2018/173608 | A1 | 9/2018 |
| WO | WO 2018/176500 | A1 | 9/2018 |

OTHER PUBLICATIONS

International Search Report (PCT/ISA/210) issued in PCT/JP2020/043679, dated Jan. 26, 2021.

* cited by examiner

INSULATED WIRE, COIL, AND ELECTRICAL OR ELECTRONIC EQUIPMENT

CROSS-REFERENCE TO RELATED APPLICATIONS

This application is a Continuation of PCT International Application No. PCT/JP20201043679 filed on Nov. 24, 2020, which claims priority under 35 U.S.C. § 119 (a) to Japanese Patent Application No. 2019-212158 filed in Japan on Nov. 25, 2019. Each of the above applications is hereby expressly incorporated by reference; in it is entirely, into the present application.

FIELD OF THE INVENTION

The present invention relates to an insulated wire, a coil, and electrical or electronic equipment.

BACKGROUND OF THE INVENTION

In an inverter-related device (such as coils for electrical or electronic equipment, including high-speed switching devices, inverter motors, transformers, and the like), an insulated wire (enameled wire) in which a coating layer (insulating film) made of an insulating resin is formed on the outer periphery of a conductor is used as a magnet wire.

In recent years, with the spread of hybrid cars and electric vehicles, improvement of motor efficiency is demanded, and operation of motors at high voltages and inverter control are demanded. When the insulated wire is used under such a high voltage, partial discharge (corona discharge) is likely to occur on the surface of the insulating film, which may deteriorate the insulating film. In order to suppress this partial discharge, a resin having a low dielectric constant is used as a constituent material of the insulating film.

SUMMARY OF THE INVENTION

Technical Problem

As described above, the insulated wire is required to have a high degree of insulation durability under high voltage.

In addition, there is an increasing demand for miniaturization and high output for rotating electrical machines such as automobile motors. It is necessary to wind an insulated wire around a small bobbin, increase its winding density, and place insulated wires which have been bent in limited spaces such as stator slots as much as possible. Therefore, this insulated wire is required to have not only high insulation durability but also high flexibility and excellent elongation properties.

The present invention provides an insulated wire having excellent insulation durability and also excellent elongation properties and flexibility; and a coil, and electrical or electronic equipment using the same.

Solution to Problem

As a result of diligent studies in view of the above problems, the present inventors have found that by using, in addition to the thermosetting resin, as a resin material constituting at least one layer of the insulating film, a resin (charge-adjusted resin) that is ranked lower (easily charged on the negative side) than the thermosetting resin in a tribo-electric series, the insulation durability is effectively enhanced without substantially impairing the elongation properties and flexibility of the thermosetting resin. The present invention has been realized by conducting intensive research based on such knowledge.

In the present invention, the above problems were solved by the following means:

[1] An insulated wire, including:
a conductor; and
an insulating film covering the conductor.
wherein at least one insulating layer constituting the insulating film contains:
a thermosetting resin A. and
a resin B that is ranked lower than the thermosetting resin A in a tribo-electric series.

[2] The insulated wire described in [1], wherein a polyimide resin is contained as the thermosetting resin A.

[3] The insulated wire described in [1] or [2],
wherein the thermosetting resin A constitutes a continuous phase and the resin B constitutes a dispersed phase in at least an outermost layer of the insulating film; and
wherein an area occupancy of the resin B on the outermost surface of the insulating film is 10% or more.

[4] The insulated wire described in [3], wherein the thermosetting resin A and the resin B are incompatible with each other.

[5] The insulated wire described in any one of [1] to [4], wherein resin particles having a particle diameter of 0.2 to 10 μm are contained as the resin B.

[6] The insulated wire described in any one of [1] to [5], wherein core-shell particles and/or hollow particles are contained as the resin B.

[7] The insulated wire described in any one of [1] to [6], wherein at least one kind of a fluororesin, a silicone resin, and a polypropylene resin is contained as the resin B.

[8] The insulated wire described in any one of [1] to [7], wherein the insulating film has a tensile elongation at break of 30% or more.

[9] A coil, including the insulated wire described in any one of [1] to [8].

[10] An electrical or electronic equipment, including the coil described in [9].

In the description of the present invention, any numerical expressions in a style of " . . . to . . . " will be used to indicate a range including the lower and upper limits represented by the numerals given before and after "to", respectively.

In the present invention, the insulating film containing "the thermosetting resin A" means that the thermosetting resin A is contained in a cured state in the insulating film.

Advantageous Effects of Invention

The insulated wire of the present invention is excellent in insulation durability, elongation properties, and flexibility.

DESCRIPTION OF EMBODIMENTS

[Insulated Wire]

Figure 1:
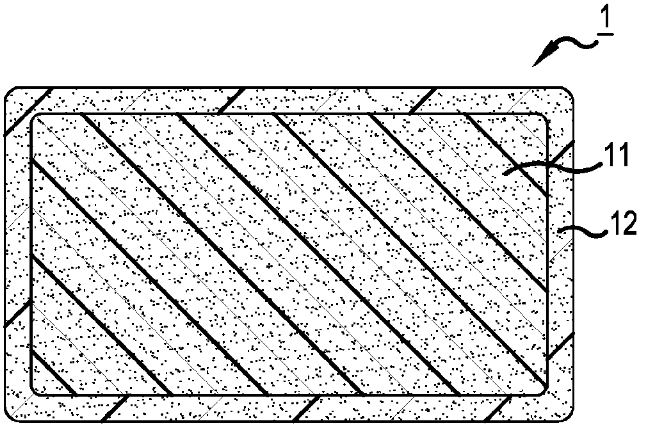
FIG. 1 is a schematic sectional view showing one embodiment of the insulated wire of the present invention.

An example of the insulated wire of the present invention will be described with reference to the drawings. However, the insulated wire of the present invention is not limited to the form shown in the drawings. For example, a form in which the insulating film has a multi-layer structure, and a form in which a conductor whose cross-section is a square, a circular shape, an elliptical shape, or the like is covered with an insulating film are also preferable as the insulated wire of the present invention.

An insulated wire 1 whose cross-sectional view is shown in FIG. 1 has a conductor 11 and an insulating film 12 formed on the outer peripheral surface of the conductor 11.

<Conductor>

As the conductor used in the present invention, a conductor conventionally used for an insulated wire can be used without particular limitations. Examples thereof include a metal conductor such as a copper wire or an aluminum wire.

As a preferable example of the conductor used in the present invention, FIG. 1 shows the case where the conductor has a rectangular cross section (rectangular shape).

In view of suppressing partial discharge from a corner portion, the rectangular conductor has preferably such a shape that chamfered edges (curvature radius r) are provided at four corners, as shown in FIG. 1. The curvature radius r is preferably 0.6 mm or less, and more preferably in a range from 0.2 to 0.4 mm.

The size of the conductor is not particularly limited, but in the case of the rectangular conductor, in the rectangular cross-sectional shape, the width (long side) thereof is preferably 1 to 5 mm, and more preferably 1.4 to 4.0 mm, and the thickness (short side) is preferably 0.4 to 3.0 mm, and more preferably 0.5 to 2.5 mm. The ratio of length (thickness:width) between the width (long side) and the thickness (short side) is preferably from 1:1 to 1:4. Meanwhile, when the conductor has a circular cross section, the diameter thereof is preferably 0.3 to 3.0 mm, and more preferably 0.4 to 2.7 mm.

<Insulating Film>

In the insulating film, at least one insulating layer constituting the insulating film contains a thermosetting resin A and a resin B (charge-adjusted resin) that is ranked lower (on a negative side) than the thermosetting resin A in the tribo-electric series (friction tribo-electric series). The insulating layer constituting the insulating film means one layer of the insulating film when the insulating film is one layer as shown in FIG. 1, or means respective layers constituting a multi-layer structure when the insulating film has a multi-layer structure.

In the present invention, for example, even when the insulating film is formed by coating and baking a plurality of times, if the constituent materials of adjacent insulating layers are the same and the content ratios of the constituent materials thereof are the same, the adjacent insulating layers are considered as one layer.

In the present invention, in a case where the constituent resin materials of the insulating layers adjacent to each other constituting the insulating film are different, or in a case where the constituent resin materials are the same but the content ratio of the constituent resin materials is different, the two adjacent insulating layers are considered as different layers.

Further, in the insulating layers adjacent to each other constituting the insulating film, one layer may contain bubbles or both layers may contain bubbles, and either or both of the thermosetting resin A and the resin B may contain bubbles (hollow portion). In any case, as described above, a relationship is only required in which the resin B (charge-adjusted resin) is ranked lower (on a negative side) than the thermosetting resin A in the tribo-electric series (friction tribo-electric series). Here, the tribo-electric series is an order indicating whether substances are likely to be positively or negatively charged when two types of substances are slid to cause friction. The negative side means that when the film of the thermosetting resin A and the film containing the resin B (charge-adjusted resin) described later are slid to cause friction as described later, the charge of the film of the thermosetting resin A is positive and the charge of the film containing the resin B is negative.

The thickness of the insulating film (when the insulating film has a multi-layer structure, the thickness of the entire multi-layer structure) is preferably set to 1 to 200 μm, more preferably 5 to 100 μm, further preferably set to 10 to 50 μm, and particularly preferably set to 20 to 40 μm.

In the insulated wire of the present invention, preferably, 20% or more of the thickness of the insulating film is composed of an insulating layer containing a thermosetting resin A and a resin B that is ranked lower than the thermosetting resin A in the tribo-electric series; and more preferably, 40% or more of the thickness of the insulating film (preferably 50% or more, more preferably 60% or more, further preferably 70% or more, and particularly preferably 80% or more) is composed of an insulating layer containing a thermosetting resin A and a resin B that is ranked lower than the thermosetting resin A in the tribo-electric series.

Further, in the case of the insulating film having a multi-layer structure, the insulated wire of the present invention preferably has a form in which at least the outermost layer contains a thermosetting resin A and a resin B that is ranked lower than the thermosetting resin A in the tribo-electric series, and also preferably has a form in which a layer other than the insulating layer in contact with the conductor contains the thermosetting resin A and the resin B that is ranked lower than the thermosetting resin A in the tribo-electric series.

Further, all of insulating layers constituting the insulating film of the insulated wire of the present invention may be in the form of containing the thermosetting resin A and the resin B that is ranked lower than the thermosetting resin A in the tribo-electric series.

In the insulating layer containing the thermosetting resin A and the resin B that is ranked lower than the thermosetting resin A in the tribo-electric series, the content of the thermosetting resin A is preferably 40% by volume or more, more preferably 50% by volume or more, and further preferably 60% by volume or more. The content of the thermosetting resin A is usually 90% by volume or less. The content of the resin B in the insulating layer is preferably 10% by volume or more, and more preferably 15% by volume or more. The content of the resin B is usually 60% by volume or less. When the thermosetting resin A and/or the resin B has a hollow portion, the value of % by volume described above is the value of % by volume including the hollow portion.

As the thermosetting resin A blended in the insulating film, a thermosetting resin used as a constituent material of the insulating film of the insulated wire can be widely applied. Specific examples of the thermosetting resin A include a polyimide resin (PI), a polyamideimide resin (PAI), a polyetherimide resin (PEI), a polyesterimide resin (PEsI), a polyurethane resin, a polyester resin (PEst), a polybenzoimidazole resin, a melamine resin, and an epoxy resin. Of these, it is preferable to use one or more kinds of a polyimide resin, a polyamideimide resin, a polyetherimide resin, a polyesterimide resin, a polyurethane resin, and a polyester resin. Among them, a thermosetting resin having an imide bond is more preferable. Examples of the thermosetting resin A having an imide bond include a polyimide resin, a polyamideimide resin, a polyetherimide resin, and a polyesterimide resin, and one or more kinds of these are preferably used.

In particular, a polyimide resin, a polyamideimide resin, and a polyesterimide resin have high heat resistance, and are excellent as constituent materials of the enameled wire. More preferably, the thermosetting resin A contains a polyimide resin, and further preferably, the thermosetting resin A is a polyimide resin.

The resin B is ranked lower than the thermosetting resin A in the tribo-electric series. That is, the resin B is a resin that is more negatively charged than the thermosetting resin A when it is tribo-electrically charged with the thermosetting resin A. In the present invention, the relationship between the thermosetting resin A and the resin B in the tribo-electric series is determined in accordance with JIS C 61340-2-2: 2013.

Specifically, a thermosetting resin A is formed into a film A having a square planar shape with a size of 100 mm in length, 100 mm in width, and 0.05 mm in thickness. A mixture prepared by adding 50 parts by mass of a resin B to 50 parts by mass of the thermosetting resin A is formed into a film B having a square planar shape with a size of 100 mm in length, 100 mm in width, and 0.05 mm in thickness. Then, the film A and the film B are stacked with the squares of the films aligned in the air under conditions of a temperature of 25° C. and a relative humidity of 50%. The film B is slid along the longitudinal direction of film A at a speed of 50 mm/sec for a distance of 50 mm while keeping the two films in contact. Then, the film B is slid back to its original position at the same speed. This is regarded as one round trip and repeated 5 round trips to tribo-electrically charge both films. After that, the surface potential of the film B is immediately measured with a potential measuring instrument.

When the measured surface potential of the film A is a positive value and the surface potential value (V) of the film B is a negative value of absolute value 0.1 V or more (−0.1 V or less), the resin B is determined to be ranked lower than the thermosetting resin A in the tribo-electric series. The surface potential value (V) of the film B measured after the tribo-electric charging is preferably −5 V or less, more preferably −10 V or less, and preferably −20 V or less. The surface potential value (V) of the film B measured after the tribo-electric charging is usually −200 V or more, and preferably −150 V or more.

As a preferable combination of the thermosetting resin A and the resin B, when the thermosetting resin A is selected from a polyimide resin, a polyamideimide resin, and a polyesterimide resin, the resin B can be selected from a silicone resin and a fluororesin. When the thermosetting resin A is a polyimide resin, a resin selected from a polyethylene resin, a polypropylene resin, and a polyvinyl chloride resin can be applied as the resin B. and it is preferable to apply a polypropylene resin.

In particular, it is preferable to adopt a combination of the following (a) to (i) as the thermosetting resin A and the resin B.

| | (Thermosetting resin A) | (Resin B) |
|---|---|---|
| (a) | Polyimide resin | Sitimne resin |
| (b) | Polyimide resin | Fluororesin |
| (c) | Poiyarnidelmide resin | Scone resin |
| (d) | Polyernibernide resin | Fluororesin |
| (e) | Polyestenmide resin | Silicone resin |
| (f) | Polyesterimide resin | Fluorciresin |
| (g) | Polyirnide resin | Polyethylene resin |
| (h) | Polyirnibe resin | Poyorcspyiene resin |
| (i) | Polyimide resin | Polyvinyl chloride resin |

In the present invention, a silicone resin suitable as the resin B is a compound having a polysiloxane structure. In the polysiloxane structure, the difference in electronegativity between O and Si that form a siloxane bond is relatively large. It is considered that Si, which has been positively charged during friction, pulls electrons from the friction partner, and as a result, the silicone resin as a whole is negatively charged.

Similarly, in fluororesin, it is considered that atoms in the fluororesin, whose electrons have been pulled by F having a large electronegativity to be positively charged, pull electrons from the friction partner, and as a result, the fluororesin as a whole or the entire composition is negatively charged. Examples of the fluororesin include polytetrafluoroethylene (PTFE), perfluoroalkoxy alkane (PFA), and perfluoroethylene propene copolymer (FEP).

Further, it is considered that a polyvinyl chloride resin is also negatively charged as a whole as described above due to Cl having a large electronegativity.

In the present invention, the thermosetting resin A may be one type of thermosetting resin or two or more types of thermosetting resins. As the resin B, one type or two or more types of resins can be used. When the thermosetting resin A is composed of two or more types of thermosetting resins, the two or more types of thermosetting resins are preferably compatible with each other. Further, when the resin B is composed of two or more types of resins, the two or more types of resins are preferably compatible with each other. The phrase "compatible with each other" means that phase separation does not occur (no sea-island structure is formed) when the resins are mixed (blended).

The thermosetting resin A and the resin B are preferably incompatible with each other. The phrase "incompatible with each other" means that phase separation occurs (a sea-island structure is formed) when the resins are mixed (blended). In this case, preferably, the thermosetting resin A constitutes a continuous phase and the resin B constitutes a dispersed phase. Further, the resin B can also be blended as resin particles (including the morphology of hollow particles and core-shell particles). The core-shell particles are not limited to specific particles as long as they have a core-shell structure. Examples of the core-shell particles include those having crosslinked polymethyl methacrylate as a core and polymethylsilsesquioxane as a shell. When the resin B is present as resin particles, the particle diameter of dispersed resin particles is preferably 0.1 to 20 μm, more preferably 0.2 to 10 μm, further preferably 0.5 to 10 μm, and particularly preferably 1.0 to 8.0 μm. This particle diameter is the average particle diameter and is announced by the manufacturer or distributor. When the particle diameter announced by the manufacturer is unknown, the above particle diameter shall be the volume-based median diameter (d50). As described above, in the present invention, the state in which the resin B is dispersed in the thermosetting resin A is also considered as a form in which the thermosetting resin A constitutes a continuous phase and the resin B constitutes a dispersed phase.

In a preferred embodiment of the insulated wire of the present invention, the thermosetting resin A constitutes a continuous phase and the resin B constitutes a dispersed phase in at least the outermost layer of the insulating film (in the case where the insulating film has a one-layer structure, it is the insulating film).

In such a form, the area occupancy of the resin B on the outermost surface of the insulating film (insulating film outermost layer surface) (the proportion of the area of the resin B constituting the outermost surface of the insulating film in the area on a plane surface of the outermost surface of the insulating film) is preferably 10% or more. As a result, the electrical life of the insulated wire can be extended, and the durability is improved. The reason for this is not yet clear, but by setting the area occupancy of the resin B to 10% or more, the surface of the insulating film can be charged to the more negative side, and when a sinusoidal alternating-current voltage is applied, the negative voltage can be actually reduced. As a result, the negative voltage of the sinusoidal alternating-current voltage can be made smaller than the breakdown voltage that damages the insulating film. Therefore, the breakdown voltage to be applied to the insulating film is narrowed down to the positive voltage, thus reducing the frequency of application of the breaking voltage on the insulating film. In addition, it is presumed that the electric charge charged on the surface of the outermost layer of the insulating film under an alternating-current voltage acts (relaxes) on the electric field of the air layer in contact with the insulating film, and as a result, the partial discharge is suppressed, thereby extending the electrical life.

The area occupancy of the resin B on the outermost surface of the insulating film is preferably 12% or more, and more preferably 14% or more. The area occupancy is usually 50% or less, preferably 40% or less, and more preferably 35% or less.

The area occupancy can be determined as follows.

The conductor is removed from the insulated wire, and the obtained tubular insulating film is cut into a flat plate shape. Then, elemental analysis is performed by SEM-EDX with the outermost surface of the insulating film (the surface opposite to the surface in contact with the conductor in the insulating film) facing upward. The area occupancy of the resin B is calculated using image analysis software.

Even when the outermost surface of the insulating film has some irregularities, the area occupancy of the resin B in the entire outermost surface of the insulating film can be determined by elemental analysis using SEM-EDX. That is, in the present invention, the area occupancy is the area occupancy rate in a plan view.

The elongation at break of the insulating film of the present invention is preferably 30% or more. When the elongation at break is 30% or more, the flexibility of the insulated wire is improved, and even if the insulated wire is strained, cracks or the like are less likely to occur in the insulating film. This elongation at break is the elongation at break in the following tensile test. The conductor is removed from the insulated wire to prepare a tubular insulating film. The tubular insulating film is subjected to a tensile test in the long axis direction at 10 mm/min in an atmosphere of a temperature of 25° C. and a relative humidity of 50% by using a tensile tester with a distance between chucks of 30 mm. The elongation at break of 30% or more means that the insulating film breaks when stretched to 130% or more, assuming that the length when the insulating film is not pulled is 100%.

Various additives may be added to the insulating film of the present invention. Examples thereof include a cell nucleating agent, an antioxidant, an antistatic agent, an ultraviolet inhibitor, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a viscosity increaser, a viscosity reducer, and an elastomer.

[Method of Producing Insulated Wire]

The insulated wire of the present invention can be produced according to an ordinary method except that the insulated wire has a configuration in which at least the outermost layer of the insulating film contains the thermosetting resin A and the resin B that is ranked lower than the thermosetting resin A in the tribo-electric series, as described above.

For example, the insulated wire of the present invention can be obtained by the following procedure. A thermosetting resin A and a resin B, which are constituent materials of the insulating film, are dissolved or dispersed in an organic solvent, and various additives are added thereto as necessary to prepare a varnish. The varnish is applied to the outer periphery of a conductor or the outer periphery of the insulating layer formed on the outer periphery of the conductor and baking it to form an insulating film. Due to the baking, the solvent in the varnish is volatilized and removed. Examples of the organic solvent include: amide-series solvents such as N-methyl-2-pyrrolidone (NMP), N,N-dimethylacetamide (DMAC), and N,N-dimethylformamide (DMF); urea-series solvents such as N,N-dimethylethyleneurea, N,N-dimethylpropyleneurea, and tetramethylurea; lactone-series solvents such as γ-butyrolactone and γ-caprolactone; carbonate-series solvents such as propylene carbonate; ketone-series solvents such as methyl ethyl ketone, methyl isobutyl ketone, and cyclohexanone; ester-series solvents such as ethyl acetate, n-butyl acetate, butyl cellosolve acetate, butyl carbitol acetate, ethyl cellosolve acetate, and ethyl carbitol acetate; glyme-series solvents such as diglyme, triglyme, and tetraglyme; hydrocarbon-series solvents such as toluene, xylene, and cyclohexane; phenol-series solvents such as cresol, phenol, and halogenated phenol; sulfone-series solvents such as sulfolane; and dimethyl sulfoxide (DMSO).

The specific baking conditions cannot be uniquely described because they vary depending on the shape or the like of the furnace to be used. In a case of a natural convection shaft furnace with a size of about 10 m, for example, the temperature inside the furnace is 400 to 650° C., and the passing time is 10 to 90 seconds.

[Coil and Electrical or Electronic Equipment]

The insulated wire of the present invention is applicable, as a coil, to a field which requires electrical properties (resistance to voltage) and heat resistance, such as various types of electrical or electronic equipment. For example, the insulated wire of the present invention is used for a motor, a transformer, and the like, by which high-performance electrical or electronic equipment can be obtained. In particular, the insulated wire is preferably used as a winding wire for driving motors of a hybrid vehicle (HV) and an electric vehicle (EV). As descried above, according to the present invention, it is possible to provide electrical or electronic equipment using the insulated wire of the present invention as a coil, such as driving motors of HV and EV.

The coil of the present invention is not particularly limited, as long as it has a form suitable for any of various types of electrical or electronic equipment. Examples thereof include: a coil formed by subjecting the insulated wire of the present invention to coil processing; and a coil formed such that, after the insulated wire of the present invention is bent, predetermined parts thereof are electrically connected.

The coil formed by subjecting the insulated wire of the present invention to coil processing is not particularly limited, and examples thereof include a coil formed by winding a long insulated wire in a spiral. In such a coil, the number of turns of the insulated wire is not particularly limited. Commonly, an iron core or the like is used to wind the insulated wire in a spiral.

Figure 2:
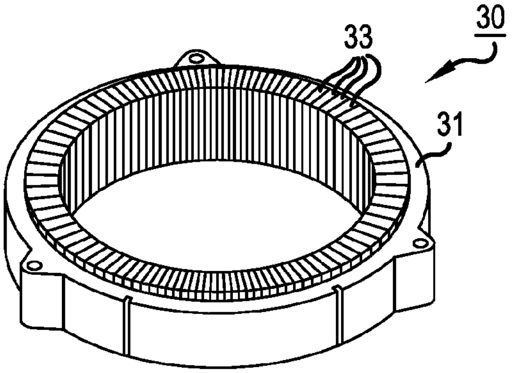
FIG. 2 is a schematic perspective view showing a preferable embodiment of a stator to be used in electrical or electronic equipment of the present invention.
Figure 3:
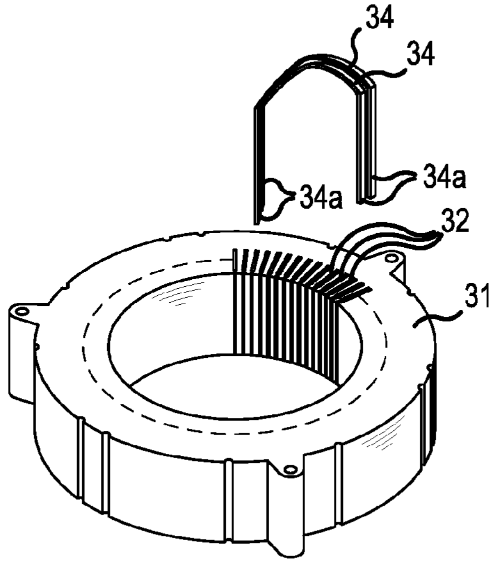
FIG. 3 is a schematic exploded perspective view showing a preferable embodiment of the stator to be used in the electrical or electronic equipment of the present invention.

Examples of the coil formed such that, after the insulated wire of the present invention is bent, predetermined parts thereof are electrically connected include a coil used for a stator of a rotating electrical machine, or the like. A coil 33 (see FIG. 2) is an example of such coil. The coil 33 is formed by cutting the insulated wire of the present invention in a prescribed length, bending the cut pieces in a U shape or the like to form a plurality of wire segments 34, and alternately connecting two open ends (terminals) 34*a* of the U shape or the like of each wire segment 34, as shown in FIG. 3.

The electrical or electronic equipment using the coil thus produced is not particularly limited. One preferred mode of such electrical or electronic equipment is a transformer. In addition, examples of the preferred mode thereof include a rotating electrical machine (particularly, driving motors of HV and EV) including the stator 30 illustrated in FIG. 2. Such rotating electrical machine can be configured similar to a conventional rotating electrical machine except for being equipped with the stator 30.

The stator 30 has a configuration similar to a configuration of a conventional stator except that the wire segments 34 are formed using the insulated wire of the present invention. Specifically, the stator 30 has a stator core 31, and the coil 33 in which, as shown in FIG. 3, the wire segments 34 produced using the insulated wire of the present invention are incorporated in slots 32 of the stator core 31 and open ends 34*a* are electrically connected. The coil 33 is fixed such that adjacent fusing layers, or the fusing layer and the slot 32 are bonded. Herein, the wire segment 34 may be placed in each slot 32 one by one. However, it is preferable that a pair of wire segments 34 is placed in each slot 32 as shown in FIG. 3. In the stator 30, the coils 33, which are formed by alternately connecting the open ends 34*a* that are two ends of the wire segments 34 which have been bent as described above, are housed in the slots 32 of the stator core 31. At this time, the wire segments 34 may be placed in the slots 32 after the open ends 34*a* thereof are connected. Alternatively, after the insulating segments 34 are placed in the slots 32, the open ends 34*a* of the wire segments 34 may be bent and connected.

The present invention will be described in more detail based on Examples given below. However, it is to be noted that the present invention is not limited to the following Examples.

EXAMPLES

Example 1

<Conductor>

A copper wire having a circular cross section (outside diameter of cross section: 1 mm) was used as the conductor.

<Insulating Paint>

To a polyimide (PI) resin varnish (trade name: Uimide, manufactured by Unitika Ltd., NMP solution with 25% by mass of PI resin component), a silicone resin (trade name: KMP590, manufactured by Shin-Etsu Chemical Co., Ltd., silicone resin particles with a particle diameter of 2.0 μm) was added in an amount of 20% by volume with respect to 80% by volume of the PI resin component, and the mixture was stirred for 3 hours. In this way, an insulating paint 1 containing a PI resin as the thermosetting resin A and a silicone resin as the resin B was obtained.

<Potential Measurement>

A PI resin film and a silicone resin-containing PI resin film formed by adding 50 parts by mass of the above silicone resin to 50 parts by mass of the PI resin, followed by mixing were prepared (both films had a square planar shape with a size of 100 mm in length, 100 mm in width, and 0.05 mm in thickness). The films were tribo-electrically charged by the method described above, and the surface potential of the silicone resin-containing PI resin film was immediately measured by a potential measuring instrument (KSD-300, manufactured by Kasuga Denki, Inc.). It was confirmed that the surface potential of the silicone resin-containing PI resin film was −30 V, and the silicone resin was ranked lower than the PI resin whose surface potential was a positive value in the tribo-electric series.

<Insulated Wire>

The PI resin varnish was applied onto a conductor and baked at a furnace temperature of 520° C. to form an insulating layer (polyimide resin layer) having a thickness of 4 μm. An operation of applying the insulating paint 1 onto the insulating layer and baking at a furnace temperature of 520° C. was repeated a plurality of times to form a film having a predetermined film thickness, and thus the insulated wire of Example 1 was obtained. The thickness of the entire insulating film (thickness including the insulating layer having a thickness of 4 μm) is shown in Table 1 below. The layer formed from the insulating paint 1 had a structure in which the silicone resin (dispersed phase) was dispersed in the PI resin (continuous phase).

Example 2

To a polyamide imide (PAI) resin varnish (trade name: HI-406, manufactured by Hitachi Chemical Co., Ltd., NMP solution with 32% by mass of resin component), a silicone resin (trade name: KMP590, manufactured by Shin-Etsu Chemical Co., Ltd., silicone resin particles with a particle diameter of 2.0 μm) was added in an amount of 25% by volume with respect to 75% by volume of the PAI resin component, and the mixture was stirred for 3 hours. In this way, an insulating paint 2 containing a PAI resin as the thermosetting resin A and a silicone resin as the resin B was obtained.

The insulated wire of Example 2 was obtained in the same manner as in Example 1 except that the insulating paint 2 was used in place of the insulating paint 1 in Example 1. The layer formed from the insulating paint 2 had a structure in which the silicone resin (dispersed phase) was dispersed in the PAI resin (continuous phase).

Further, a PAI resin film and a silicone resin-containing PAI resin film were produced in the same manner as in Example 1. The films were tribo-electrically charged by the method described above, and the surface potential of the silicone resin-containing PAI resin film was immediately measured by a potential measuring instrument (KSD-300, manufactured by Kasuga Denki, Inc.). It was confirmed that the surface potential of the silicone resin-containing PAI resin film was −45 V, and the silicone resin was ranked lower than the PAI resin whose surface potential was a positive value in the tribo-electric series.

Example 3

The insulated wire of Example 3 was obtained in the same manner as in Example 1 except that, in Example 1, an insulating paint 3 was prepared by using, as the resin B of the insulating paint 1, a fluororesin (trade name: Polymist F5A, manufactured by Solvay S.A., PTFE particles with a particle diameter of 4.0 μm) in an amount of 25% by volume with respect to 75% by volume of the PI resin component, in place of the silicone resin in an amount of 20% by volume with respect to 80% by volume of the PI resin component, and the insulating paint 3 was used in place of the insulating paint 1. The layer formed from the insulating paint 3 had a structure in which the fluororesin (dispersed phase) was dispersed in the PI resin (continuous phase).

Further, a PI resin film and a fluororesin-containing PI resin film were prepared in the same manner as in Example 1. The films were tribo-electrically charged by the method described above, and the surface potential of the fluororesin-containing film was immediately measured by a potential measuring instrument (KSD-300, manufactured by Kasuga Denki, Inc.). It was confirmed that the surface potential of the fluororesin-containing PI resin film was −90 V, and the fluororesin was ranked lower than the PI resin whose surface potential was a positive value in the tribo-electric series.

Example 4

The insulated wire of Example 4 was obtained in the same manner as in Example 2 except that, in Example 2, the insulating paint 4 was prepared by using, as the resin B of the insulating paint 2, a fluororesin (trade name: Polymist F5A, manufactured by Solvay S.A., PTFE particles with a particle diameter of 4.0 μm) in an amount of 25% by volume with respect to 75% by volume of the PAI resin component, in place of the silicone resin in an amount of 25% by volume with respect to 75% by volume of the PAI resin component, and the insulating paint 4 was used in place of the insulating paint 2. The layer formed from the insulating paint 4 had a structure in which the fluororesin (dispersed phase) was dispersed in the PAI resin (continuous phase).

Further, a PAI resin film and a fluororesin-containing PAI resin film were prepared in the same manner as in Example 1. The films were tribo-electrically charged by the method described above, and the surface potential of the fluororesin-containing PAI resin film was immediately measured by a potential measuring instrument (KSD-300, manufactured by Kasuga Denki, Inc.). It was confirmed that the surface potential of the fluororesin-containing PAI resin film was −95 V. and the fluororesin was ranked lower than the PAI resin whose surface potential was a positive value in the tribo-electric series.

Example 5

The insulated wire of Example 5 was obtained in the same manner as in Example 1 except that, in Example 1, an insulating paint 5 was prepared by using, as the resin B of the insulating paint 1, a silicone resin (trade name; KMP590, manufactured by Shin-Etsu Chemical Co., Ltd., silicone resin particles with a particle diameter of 2.0 μm) in an amount of 35% by volume with respect to 65% by volume of the PI resin component, in place of the silicone resin in an amount of 20% by volume with respect to 80% by volume of the PI resin component, and the insulating paint 5 was used in place of the insulating paint 1. The layer formed from the insulating paint 5 had a structure in which the silicone resin (dispersed phase) was dispersed in the PI resin (continuous phase).

Example 6

The insulated wire of Example 6 was obtained in the same manner as in Example 1 except that, in Example 1, an insulating paint 6 was prepared by using, as the resin B of the insulating paint 1, a silicone resin (trade name; KNP590, manufactured by Shin-Etsu Chemical Co., Ltd., silicone resin particles with a particle diameter of 2 μm) in an amount of 8% by volume with respect to 92% by volume of the PI resin component, in place of the silicone resin in an amount of 20% by volume with respect to 80% by volume of the PI resin component, and the insulating paint 6 was used in place of the insulating paint 1. The layer formed from the insulating paint 6 had a structure in which the silicone resin (dispersed phase) was dispersed in the PI resin (continuous phase).

Example 7

To a polyesterimide resin varnish (trade name: Neoheat 8600A, polyesterimide resin component 30% by mass, manufactured by Totoku Toryo Co., Ltd.), a fluororesin (trade name: Polymist F5A, manufactured by Solvay S.A., PTFE particles with a particle diameter of 4 μm) was added in an amount of 30% by volume with respect to 70% by volume of the polyesterimide resin component, and the mixture was stirred for 3 hours. In this way, an insulating paint 7 containing a polyesterimide resin as the thermosetting resin A and a fluororesin as the resin B was obtained.

The insulated wire of Example 7 was obtained in the same manner as in Example 1 except that the insulating paint 7 was used in place of the insulating paint 1 in Example 1. The layer formed from the insulating paint 7 had a structure in which the fluororesin (dispersed phase) was dispersed in the polyesterimide resin (continuous phase).

A polyesterimide resin film and a fluororesin-containing polyesterimide resin film were prepared in the same manner as in Example 1. The films were tribo-electrically charged by the method described above, and the surface potential of the fluororesin-containing polyesterimide resin film was immediately measured by a potential measuring instrument (KSD-300, manufactured by Kasuga Denki, Inc.). It was confirmed that the surface potential of the fluororesin-containing polyesterimide resin film was −105 V, and the fluororesin was ranked lower than the polyesterimide resin whose surface potential was a positive value in the tribo-electric series.

Example 8

The insulated wire of Example 8 was obtained in the same manner as in Example 1 except that the thickness of the entire insulating film (thickness including the insulating layer having a thickness of 4 μm) was changed as shown in Table 2 below in Example 1. The layer formed from the insulating paint 1 had a structure in which the silicone resin (dispersed phase) was dispersed in the PI resin (continuous phase).

Example 9

The insulated wire of Example 9 was obtained in the same manner as in Example 1 except that, in Example 1, an insulating paint 9 was prepared by using, as the resin B of the insulating paint 1, a silicone resin (trade name; KMP590, manufactured by Shin-Etsu Chemical Co., Ltd., silicone resin particles with a particle diameter of 2.0 μm) in an amount of 25% by volume with respect to 75% by volume of the PI resin component, in place of the silicone resin in an amount of 20% by volume with respect to 80% by volume of the PI resin component, the insulating paint 9 was used in place of the insulating paint 1, and the thickness of the entire insulating film (thickness including the insulating layer having a thickness of 4 μm) was changed as shown in Table 2 below. The layer formed from the insulating paint 9 had a structure in which the silicone resin (dispersed phase) was dispersed in the PI resin (continuous phase).

Example 10

The insulated wire of Example 10 was obtained in the same manner as in Example 1 except that, in Example 1, the insulating paint 3 was used in place of the insulating paint 1, and the thickness of the entire insulating film (thickness including the insulating layer having a thickness of 4 μm) was changed as shown in Table 2 below. The layer formed from the insulating paint 3 had a structure in which the fluororesin (dispersed phase) was dispersed in the PI resin (continuous phase).

Example 11

The insulated wire of Example 11 was obtained in the same manner as in Example 1 except that, in Example 1, an insulating paint 11 was prepared by using, as the resin B of the insulating paint 1, a fluororesin (trade name: Polymist F5A, manufactured by Solvay S.A., PTFE particles with a particle diameter of 4 μm) in an amount of 30% by volume with respect to 70% by volume of the PI resin component, in place of the silicone resin in an amount of 20% by volume with respect to 80% by volume of the PI resin component, the insulating paint 11 was used in place of the insulating paint 1, and the thickness of the entire insulating film (thickness including the insulating layer having a thickness of 4 μm) was changed as shown in Table 2 below. The layer formed from the insulating paint 11 had a structure in which the fluororesin (dispersed phase) was dispersed in the PI resin (continuous phase).

Example 12

The insulated wire of Example 12 was obtained in the same manner as in Example 1 except that, in Example 1, an insulating paint 12 was prepared by using, as the resin B of the insulating paint 1, core-shell particles having crosslinked polymethyl methacrylate as a core and polymethylsilsesquioxane as a shell (trade name: Silcrusta MK03, manufactured by Nikko Rica Corporation, particle diameter: 3 μm) in an amount of 20% by volume with respect to 80% by volume of the PI resin component, in place of the silicone resin in an amount of 20% by volume with respect to 80% by volume of the PI resin component, the insulating paint 12 was used in place of the insulating paint 1, and the thickness of the entire insulating film (thickness including the insulating layer having a thickness of 4 μm) was changed as shown in Table 2 below. The layer formed from the insulating paint 12 had a structure in which the core-shell particles (dispersed phase) were dispersed in the PI resin (continuous phase).

Further, a PI resin film and a core-shell particle-containing PI resin film were prepared in the same manner as in Example 1. The films were tribo-electrically charged by the method described above, and the surface potential of the core-shell particle-containing PI resin film was immediately measured by a potential measuring instrument (KSD-300, manufactured by Kasuga Denki, Inc.). It was confirmed that the surface potential of the core-shell particle-containing PI resin film was −25 V, and the core-shell particle was ranked lower than the PI resin whose surface potential was a positive value in the tribo-electric series.

Example 13

The insulated wire of Example 13 was obtained in the same manner as in Example 1 except that, in Example 1, an insulating paint 13 was prepared by using, as the resin B of the insulating paint 1, core-shell particles having crosslinked polymethyl methacrylate as a core and polymethylsilsesquioxane as a shell (trade name: Silcrusta MK03, manufactured by Nikko Rica Corporation, particle diameter: 3 μm) in an amount of 25% by volume with respect to 75% by volume of the PI resin component, in place of the silicone resin in an amount of 20% by volume with respect to 80% by volume of the PI resin component, the insulating paint 13 was used in place of the insulating paint 1, and the thickness of the entire insulating film (thickness including the insulating layer having a thickness of 4 μm) was changed as shown in Table 2 below. The layer formed from the insulating paint 13 had a structure in which the core-shell particles (dispersed phase) were dispersed in the PI resin (continuous phase).

Example 14

The insulated wire of Example 14 was obtained in the same manner as in Example 1 except that, in Example 1, an insulating paint 14 was prepared by using, as the resin B of the insulating paint 1, a polypropylene resin (trade name: PPW-5J, manufactured by Seishin Enterprise Co., Ltd., polypropylene (PP) particles with a particle diameter of 5 μm) in an amount of 20% by volume with respect to 80% by volume of the PI resin component, in place of the silicone resin in an amount of 20% by volume with respect to 80% by volume of the PI resin component, the insulating paint 14 was used in place of the insulating paint 1, and the thickness of the entire insulating film (thickness including the insulating layer having a thickness of 4 μm) was changed as shown in Table 2 below. The layer formed from the insulating paint 14 had a structure in which the polypropylene particles (dispersed phase) were dispersed in the PI resin (continuous phase).

Further, a PI resin film and a polypropylene-containing PI resin film were prepared in the same manner as in Example 1. The films were tribo-electrically charged by the method described above, and the surface potential of the polypropylene-containing PI resin film was immediately measured by a potential measuring instrument (KSD-300, manufactured by Kasuga Denki, Inc.). It was confirmed that the surface potential of the polypropylene-containing PI resin film was −10 V, and the polypropylene was ranked lower than the PI resin whose surface potential was a positive value in the tribo-electric series.

Comparative Example 1

An operation of applying the PI resin varnish onto a conductor and baking at a furnace temperature of 520° C.

was repeated a plurality of times to form an insulating film having a thickness of 27 μm, and thus the insulated wire of Comparative Example 1 was obtained.

Comparative Example 2

An operation of applying the PAI resin varnish onto a conductor and baking at a furnace temperature of 520° C. was repeated a plurality of times to form an insulating film having a thickness of 27 μm, and thus the insulated wire of Comparative Example 2 was obtained.

Comparative Example 3

The insulated wire of Comparative Example 3 was obtained in the same manner as in Example 1 except that, in Example 1, a comparative insulating paint 3 was prepared by using, as the resin B of the insulating paint 1, an acrylic resin (trade name: MX-150, manufactured by Soken Chemical & Engineering Co., Ltd., acrylic resin particles with a particle diameter of 1.5 μm) in an amount of 18% by volume with respect to 82% by volume of the PI resin component, in place of the silicone resin in an amount of 20% by volume with respect to 80% by volume of the PI resin component, and the comparative insulating paint 3 was used in place of the insulating paint 1. The layer formed from the comparative insulating paint 3 had a structure in which the acrylic resin (dispersed phase) was dispersed in the PI resin (continuous phase).

Further, a PI resin film and an acrylic resin-containing PI resin film were prepared in the same manner as in Example 1. The films were tribo-electrically charged by the method described above, and the surface potential of the acrylic resin-containing PI resin film was immediately measured by a potential measuring instrument (KSD-300, manufactured by Kasuga Denki, Inc.). It was confirmed that the surface potential of the acrylic resin-containing PI resin film was +20 V, and the acrylic resin was ranked higher than the PI resin in the tribo-electric series.

Comparative Example 4

An insulated wire was obtained in the same manner as in Example 2 except that, in Example 2, a comparative insulating paint 4 was prepared by using, as the resin B of the insulating paint 2, a metal oxide (trade name: HT0210, manufactured by Toho Titanium Co., Ltd., titanium dioxide particles with a particle diameter of 2.1 μm) in an amount of 14% by volume with respect to 86% by volume of the PAI resin component, in place of the silicone resin in an amount of 25% by volume with respect to 75% by volume of the PAI resin component, and the comparative insulating paint 4 was used in place of the insulating paint 2. The layer formed from the comparative insulating paint 4 had a structure in which the titanium dioxide (dispersed phase) was dispersed in the PAI resin (continuous phase). Further, a PAI resin film and a titanium dioxide-containing PAI resin film were prepared in the same manner as in Example 1. The films were tribo-electrically charged by the method described above, and the surface potential of the titanium dioxide-containing PAI resin film was immediately measured by a potential measuring instrument (KSD-300, manufactured by Kasuga Denki, Inc.). It was confirmed that the surface potential of the titanium dioxide-containing PAI resin film was +50 V, and the titanium dioxide was ranked higher than the PAI resin in the tribo-electric series.

Comparative Example 5

An operation of applying the PI resin varnish onto a conductor and baking at a furnace temperature of 520° C. was repeated a plurality of times to form an insulating film having a thickness of 80 μm, and thus the insulated wire of Comparative Example 5 was obtained.

Comparative Example 6

An operation of applying the PI resin varnish onto a conductor and baking at a furnace temperature of 520° C. was repeated a plurality of times to form an insulating film having a thickness of 200 μm, and thus the insulated wire of Comparative Example 6 was obtained.

Various physical properties were measured for each insulated wire. The methods of measuring these physical properties are as follows.

[Partial Discharge Inception Voltage (PDIV)]

A test piece in which two insulated wires were twisted in a twisted manner was prepared. An alternating-current voltage of a sine wave of 50 Hz was applied between the respective conductors, and a voltage (effective value) when the discharge charge amount was 10 pC was measured while continuously increasing the voltage was measured at normal temperature (20° C.) using a partial discharge tester (KPD2050, manufactured by Kikusui Electronics Corp.) The measured values were evaluated on the basis of evaluation criteria described below.

—Evaluation Criteria for Partial Discharge Inception Voltage—

○: 600 Vrms or more x: Less than 600 Vrms

[Electrical Life]

Two insulated wires were twisted. An alternating-current voltage (sine wave: 10 kHz) of a magnitude of the value obtained by adding 10% of the PDIV value measured as described above to the PDIV value was applied between the respective conductors, and a time until dielectric breakdown occurred was measured at normal temperature (20° C.). The measurement results were evaluated on the basis of the following evaluation criteria. The "alternating-current voltage of a magnitude of the value obtained by adding 10% of the PDIV value to the PDIV value" means, for example, when the measured PDIV value is 600 Vrms, it is 660 Vrms.

—Evaluation Criteria for Electrical Life—

⊙: 3,000 minutes or more

○: 2,000 minutes or more and less than 3,000 minutes x: Less than 2,000 minutes

[Tensile Elongation at Break]

The conductor was removed from the insulated wire to prepare a tubular insulating film having an inside diameter of 1.0 mm. The tubular insulating film was subjected to a tensile test in the long axis direction at 10 mm/min in an atmosphere of a temperature of 25° C. and a relative humidity of 50% by using a tensile tester with a distance between chucks of 30 mm, and the elongation at break was measured. The measurement results were evaluated on the basis of the following evaluation criteria.

⊙: 30% or more

○: 15% or more and less than 30% x: Less than 15%

[Flexibility]

Presence of cracks in the film when the insulated wire is stretched 10% (stretched to 110% with the original length as 100%) and then wound tightly around the insulated wire itself 10 turns so that the wires come into contact with each other was visually checked, and the results were evaluated on the basis of the following evaluation criteria.

○: There is no crack.

x: There is a crack.

[Area Occupancy of Resin B on Outermost Surface of Insulating Film]

The conductor was removed from the insulated wire, the obtained tubular insulating film was cut into a flat plate shape, and the outermost surface thereof was turned up. Elemental analysis was performed on this upper surface by SEM (trade name: SU8020, manufactured by Hitachi High-Tech Corporation)-EDX (product name: X-Max, manufactured by Horiba, Ltd.). Silicon atoms were detected for the detection of the silicone resin, fluorine atoms were detected for the detection of the fluororesin, silicon atoms were detected for the detection of the core-shell particle, and titanium atoms were detected for the detection of the metal oxide (titanium dioxide). The image obtained at 8 ekV and 5,000 times was analyzed using image analysis software (trade name: WinROOF, manufactured by Mitani Corporation), and the area occupancy of the resin B was calculated.

For the polypropylene and acrylic resin, the occupied area of the polypropylene and acrylic resin was calculated by detecting nitrogen atoms, which are included in the polyimide resin and not included in the polypropylene and acrylic resin, and subtracting the area of the nitrogen atom from the area of the entire image.

The relationship between the thermosetting resin A and the resin B in the tribo-electric series was determined as described above. As a potential measuring instrument for measuring the surface potential, a digital low potential measuring instrument (KSD-300, manufactured by Kasuga Denki, Inc.) was used.

The results are shown in Tables 1 to 3 below.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Thermosetting resin A | Kind | PI | PAI | PI | PAI | PI | PI | PEsI |
| Resin B | Kind | Silicone | Silicone | PTFE | PTFE | Silicone | Silicone | PTFE |
| | Particle Diameter (μm) | 2.0 | 2.0 | 4.0 | 4.0 | 2.0 | 2.0 | 4.0 |
| | Area occupancy (%) | 15 | 20 | 15 | 15 | 30 | 5 | 20 |
| Film thickness (μm) | | 27 | 27 | 28 | 28 | 29 | 27 | 29 |
| Partial discharge inception voltage | | ○ | ○ | ○ | ○ | ○ | ○ | ○ |
| Electrical life | | ⊙ | ⊙ | ⊙ | ⊙ | ⊙ | ○ | ⊙ |
| Tensile elongation at break | | ⊙ | ○ | ⊙ | ○ | ⊙ | ⊙ | ○ |
| Flexibility | | ○ | ○ | ○ | ○ | ○ | ○ | ○ |

Remarks: 'Ex.' means Exmaple according to this invention, and 'PEsI' means polyesterimide.

TABLE 2

| | | Ex. 8 | Ex. 9 | Ex. 10 | Ex. 11 | Ex. 12 | Ex. 13 | Ex. 14 |
|---|---|---|---|---|---|---|---|---|
| Thermosetting resin A | Kind | PI | PI | PI | PI | PI | PI | PI |
| Resin B | Kind | Silicone | Silicone | PTFE | PTFE | Core-shell | Core-shell | PP |
| | Particle Diameter (μm) | 2.0 | 2.0 | 4.0 | 4.0 | 3.0 | 3.0 | 5.0 |
| | Area occupancy (%) | 15 | 20 | 15 | 20 | 15 | 20 | 15 |
| Film thickness (μm) | | 80 | 200 | 85 | 180 | 60 | 190 | 70 |
| Partial discharge inception voltage | | ○ | ○ | ○ | ○ | ○ | ○ | ○ |
| Electrical life | | ⊙ | ⊙ | ⊙ | ⊙ | ⊙ | ⊙ | ⊙ |
| Tensile elongation at break | | ⊙ | ⊙ | ⊙ | ⊙ | ⊙ | ⊙ | ⊙ |
| Flexibility | | ○ | ○ | ○ | ○ | ○ | ○ | ○ |

Remarks: 'Ex.' means Example according to this invention.

TABLE 3

| | | CEx. 1 | CEx. 2 | CEx. 3 | CEx. 4 | CEx. 5 | CEx. 6 |
|---|---|---|---|---|---|---|---|
| Thermosetting resin A | Kind | PI | PAI | PI | PAI | PI | PI |
| Resin B or additives | Kind | — | — | Acrylic | Titanium dioxide | — | — |
| | Particle Diameter (μm) | — | — | 1.5 | 2.0 | — | — |

TABLE 3-continued

| | CEx. 1 | CEx. 2 | CEx. 3 | CEx. 4 | CEx. 5 | CEx. 6 |
|---|---|---|---|---|---|---|
| Area occupancy (%) | — | — | 10 | 12 | — | — |
| Film thickness (μm) | 27 | 27 | 27 | 27 | 80 | 200 |
| Partial discharge inception voltage | ○ | ○ | ○ | ○ | ○ | ○ |
| Electrical life | X | X | X | ⊙ | X | X |
| Tensile elongation at break | ⊙ | ○ | ⊙ | X | ⊙ | ⊙ |
| Flexibility | ○ | ○ | ○ | X | ○ | ○ |

Remarks: 'CEx.' means Comparative Example.

As shown in the above table, the insulated wires, in which the insulating layer included an insulating film containing no resin that is ranked lower than the thermosetting resin A in the tribo-electric series, had a short electrical life (Comparative Examples 1 to 3, 5, and 6).

The insulated wire, in which the insulating layer included an insulating film containing an insulating metal oxide (titanium dioxide), had a long electrical life and excellent insulation durability while having poor flexibility (elongation, flexibility) of the insulating film (Comparative Example 4).

On the other hand, in all the insulated wires including an insulating film satisfying the provisions of the present invention, the insulating film exhibited sufficient elongation properties and flexibility, the PDIV of the insulated wire including these insulating films was high, and the electrical life thereof was also long (Examples 1 to 14).

The present invention has been described as related to the present embodiments. It is our intention that the invention not be limited by any of the details of the description unless otherwise specified, but rather be construed broadly within its spirit and scope as set out in the attached claims.

DESCRIPTION OF SYMBOLS

1 Insulated wire

11 Conductor

12 Insulating film

30 Stator

31 Stator core

32 Slot

33 Coil

34 Wire segment

**34*a*** Open end

The invention claimed is:

1. An insulated wire, comprising:

a conductor; and an insulating film covering the conductor, wherein at least one insulating layer of the insulating film contains:

a thermosetting resin A, and a resin B that is ranked lower than the thermosetting resin A in a tribo-electric series, wherein the thermosetting resin A comprises a continuous phase and the resin B comprises a dispersed phase in at least an outermost layer of the insulating film; and wherein an area occupancy of the resin B on the outermost surface of the insulating film is 12% or more.

2. The insulated wire according to claim 1, wherein the thermosetting resin A comprises a polyimide resin.

3. The insulated wire according to claim 1, wherein the thermosetting resin A and the resin B are incompatible with each other.

4. The insulated wire according to claim 1, wherein the resin B comprises resin particles having a particle diameter of 0.2 to 10 μm.

5. The insulated wire according to claim 1, wherein the resin B comprises core-shell particles and/or hollow particles.

6. The insulated wire according to claim 1, wherein the resin B comprises at least one kind of a fluororesin, a silicone resin, and a polypropylene resin.

7. The insulated wire according to claim 1, wherein the insulating film has a tensile elongation at break of 30% or more.

8. A coil, comprising the insulated wire according to claim 1.

9. An electrical or electronic equipment, comprising the coil according to claim 8.

10. The insulated wire according to claim 1, wherein the area occupancy of the resin B on the outermost surface of the insulating film is 14% or more.

* * * * *